(12) United States Patent
Koga

(10) Patent No.: US 9,477,063 B2
(45) Date of Patent: Oct. 25, 2016

(54) LENS BARREL

(71) Applicant: Panasonic Corporation, Osaka (JP)

(72) Inventor: Akira Koga, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 28 days.

(21) Appl. No.: 14/317,242

(22) Filed: Jun. 27, 2014

(65) Prior Publication Data

US 2015/0022903 A1    Jan. 22, 2015

(30) Foreign Application Priority Data

Jul. 22, 2013 (JP) ................................. 2013-151404
Jun. 9, 2014 (JP) ................................. 2014-118280

(51) Int. Cl.
G02B 15/14    (2006.01)
G02B 7/14     (2006.01)
G03B 17/14    (2006.01)

(52) U.S. Cl.
CPC ................. *G02B 7/14* (2013.01); *G03B 17/14* (2013.01); *G03B 2205/0046* (2013.01); *G03B 2205/0092* (2013.01); *G03B 2206/00* (2013.01)

(58) Field of Classification Search
CPC  G02B 7/14; G03B 17/14; G03B 2205/0046; G03B 2205/0092; G03B 2206/00
USPC ......................................... 359/630, 699–706
See application file for complete search history.

(56) References Cited

U.S. PATENT DOCUMENTS

| 4,952,955 | A | * | 8/1990 | Iwata | ................... | G03B 19/07 396/75 |
| 8,854,748 | B2 | * | 10/2014 | Homme | ................. | G03B 17/04 359/557 |
| 2005/0185950 | A1 | | 8/2005 | Omiya et al. | | |
| 2013/0050855 | A1 | * | 2/2013 | Ito | .......................... | G02B 7/08 359/823 |

FOREIGN PATENT DOCUMENTS

JP    2005-275353 A    10/2005

* cited by examiner

Primary Examiner — Thomas K Pham
Assistant Examiner — Vipin Patel
(74) Attorney, Agent, or Firm — Renner, Otto, Boisselle & Sklar, LLP

(57) ABSTRACT

Provided is a lens barrel whose diameter can be reduced. The lens barrel includes a rotary frame having a gear on an inner peripheral surface, and a retracting lens frame which holds a retracting lens configured to retract from an optical axis along with rotation of the rotary frame. A position where the retracting lens retracts is where the gear of the rotary frame is located when the retracting lens is positioned on the optical axis. The rotary frame includes a first cam groove on an outer peripheral surface, and a second cam groove on the inner peripheral surface. The lens barrel also includes a first lens frame having a first cam follower which is mounted on the first cam groove, and a second lens frame having a second cam follower which is mounted on the second cam groove. The retracting lens frame is held by the second lens frame.

3 Claims, 8 Drawing Sheets

LENS BARREL

BACKGROUND

1. Technical Field

A technique disclosed herein relates to a collapsible lens barrel.

2. Description of the Related Art

Recently, an imaging device which generates image data of a subject is rapidly spreading. As such an imaging device, for example, there is known an integral-type camera or a lens-interchangeable-type camera. A lens barrel is incorporated into the integral-type camera. The lens-interchangeable-type camera includes a camera body, and a lens barrel mountable on the camera body.

Currently, as a technique for reducing the entire length when the lens barrel collapses, there is disclosed a retracting technique (Unexamined Japanese Patent Publication No. 2005-275353).

SUMMARY

It is an object of this disclosure to provide a technique which can further reduce a diameter of a lens barrel by a retracting technique.

A lens barrel includes a rotary frame having a gear on an inner peripheral surface, and a retracting lens frame which holds a retracting lens configured to retract from an optical axis along with rotation of the rotary frame. A position where the retracting lens retracts is a position where the gear of the rotary frame is located when the retracting lens is positioned on an optical axis.

According to the technique disclosed herein, it is possible to reduce the diameter of the lens barrel.

DETAILED DESCRIPTION OF THE PREFERRED EMBODIMENT

Hereinafter, an exemplary embodiment will be described with reference to the drawings as appropriate. However, descriptions with more detail than necessary may be omitted. For example, the detailed description of matters which are already well-known and the repeated description of the substantially same structures may be omitted. This is to avoid the following descriptions from being unnecessarily redundant and to allow those skilled in the art to easily understand them.

Further, the present inventors provide the accompanying drawings and the following descriptions to allow those skilled in the art to sufficiently understand the present disclosure, and the subject defined in the claims is not intended to be restricted by the claims.

First Embodiment

Figure 1:
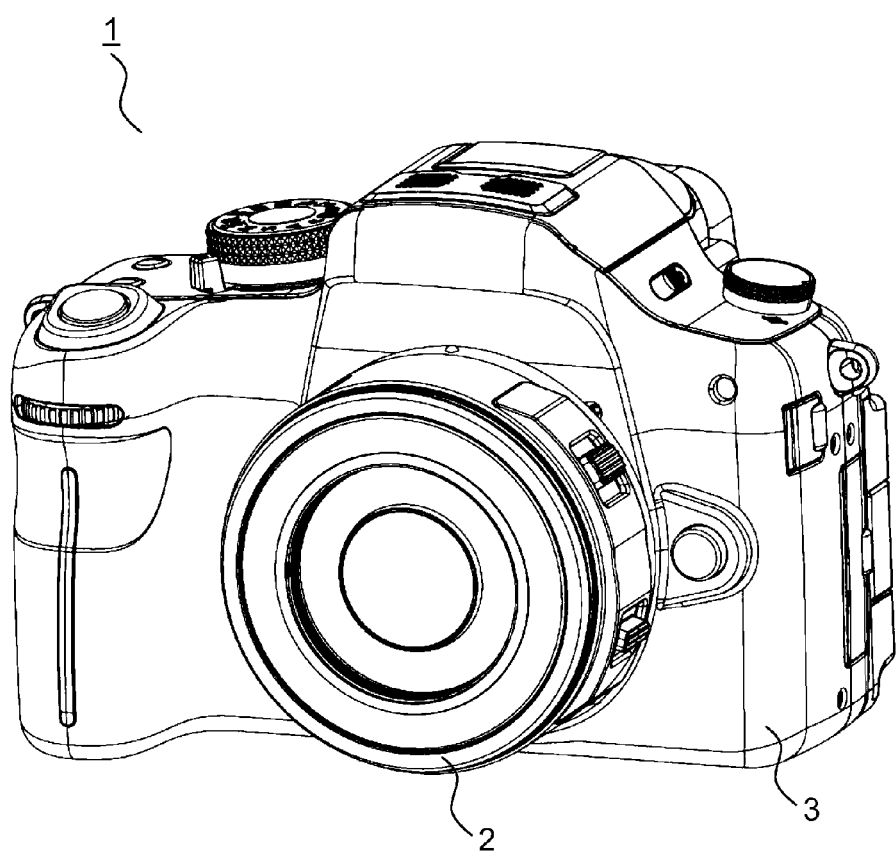
FIG. 1 is a perspective view of imaging device 1.

FIG. 1 is a perspective view of imaging device 1. Imaging device 1 is a lens-interchangeable digital camera, and includes camera body 3, and lens barrel 2 which is detachably mounted on camera body 3 as main components thereof.

Figure 2:
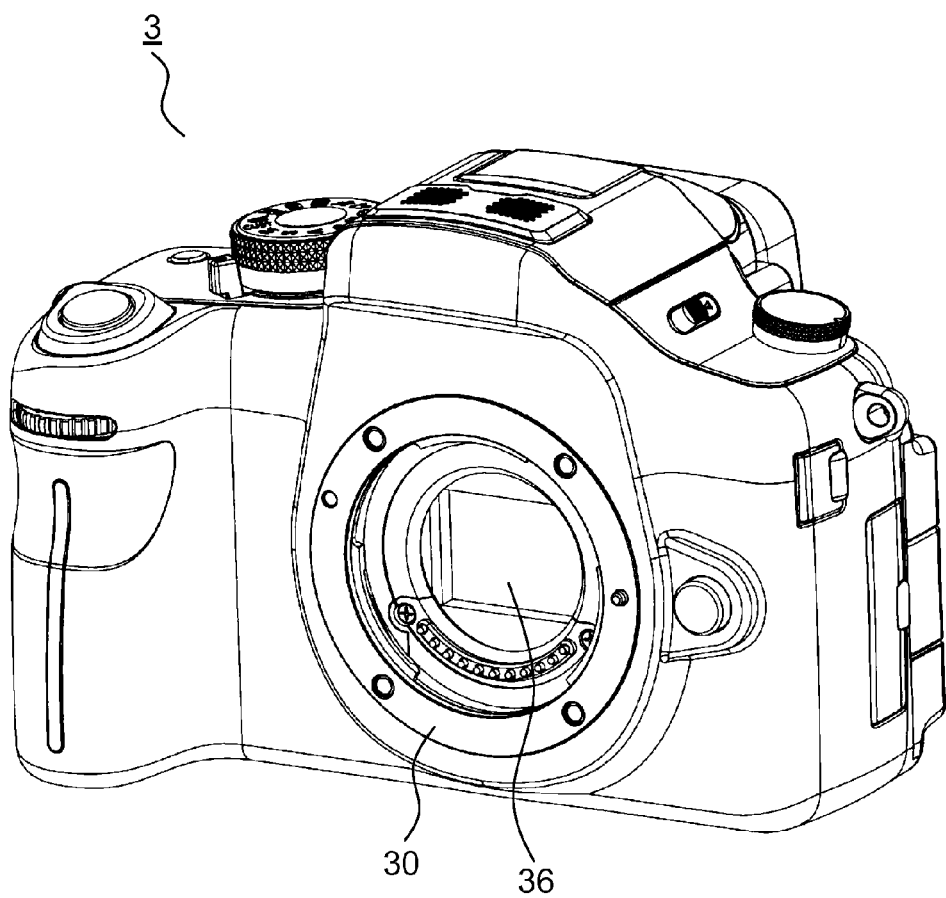
FIG. 2 is a perspective view of camera body 3.

FIG. 2 is a perspective view of camera body 3 in a state where lens barrel 2 is removed from camera body 3. Camera body 3 includes body mount 30 which is a portion on which lens barrel 2 is mounted, and imaging element 36 which captures an optical image formed by lens barrel 2 and converts the captured optical image into image data.

Figure 3:
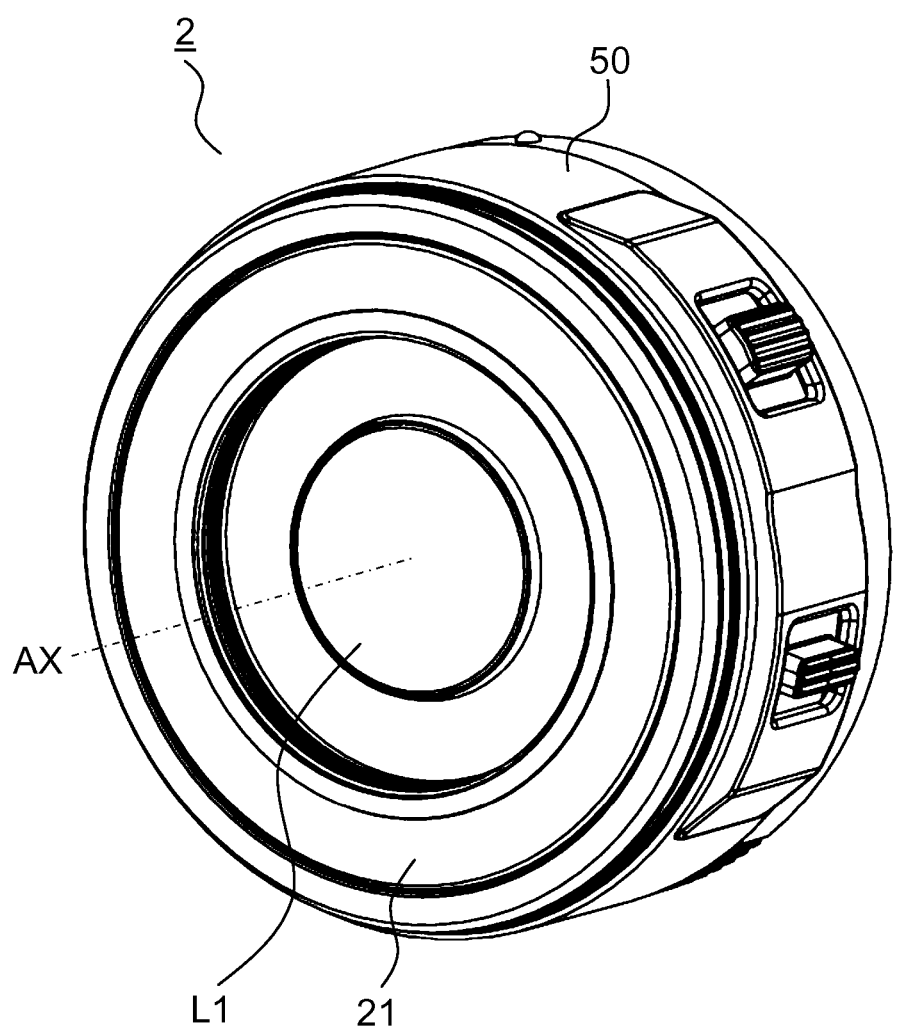
FIG. 3 is a perspective view showing a front side of lens barrel 2.
Figure 4:
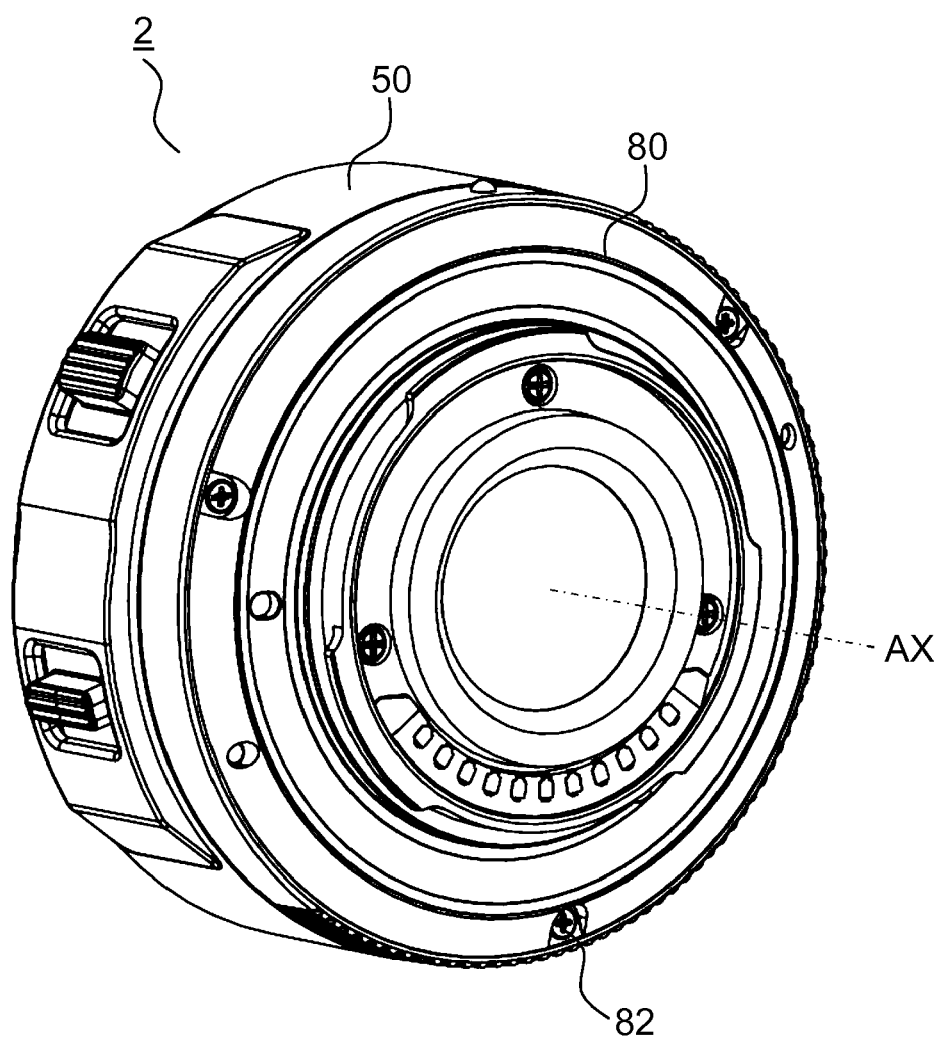
FIG. 4 is a perspective view showing a back side of lens barrel 2.

FIG. 3 is a perspective view showing a front side of lens barrel 2, and FIG. 4 is a perspective view showing a back side of lens barrel 2. That is, FIG. 3 is a perspective view of lens barrel 2 as viewed from a subject side, and FIG. 4 is a perspective view of lens barrel 2 as viewed from a camera body 3 side.

Lens barrel 2 holds lenses. In FIGS. 3 and 4, optical axis AX is expressed as an optical axis of the lenses. An optical axis AX direction is a direction along optical axis AX, and is a direction parallel to optical axis AX. A direction perpendicular to optical axis AX is referred to as a radial direction.

A shown in FIG. 4, lens barrel 2 has outer frame 50 on an outermost periphery thereof, and has lens mount 80 on a back side thereof. Outer frame 50 is connected to lens mount 80 using screws 82. Screws 82 penetrate lens mount 80 in a direction toward outer frame 50 from a lens mount 80 side along the optical axis AX direction of the lenses, and connect lens mount 80 and outer frame 50 to each other by being inserted into outer frame 50.

Lens barrel 2 is mechanically and electrically connected to camera body 3 by way of lens mount 80 and body mount 30. Lens mount 80 is an annular member which is mounted on body mount 30 of camera body 3.

Figure 5:
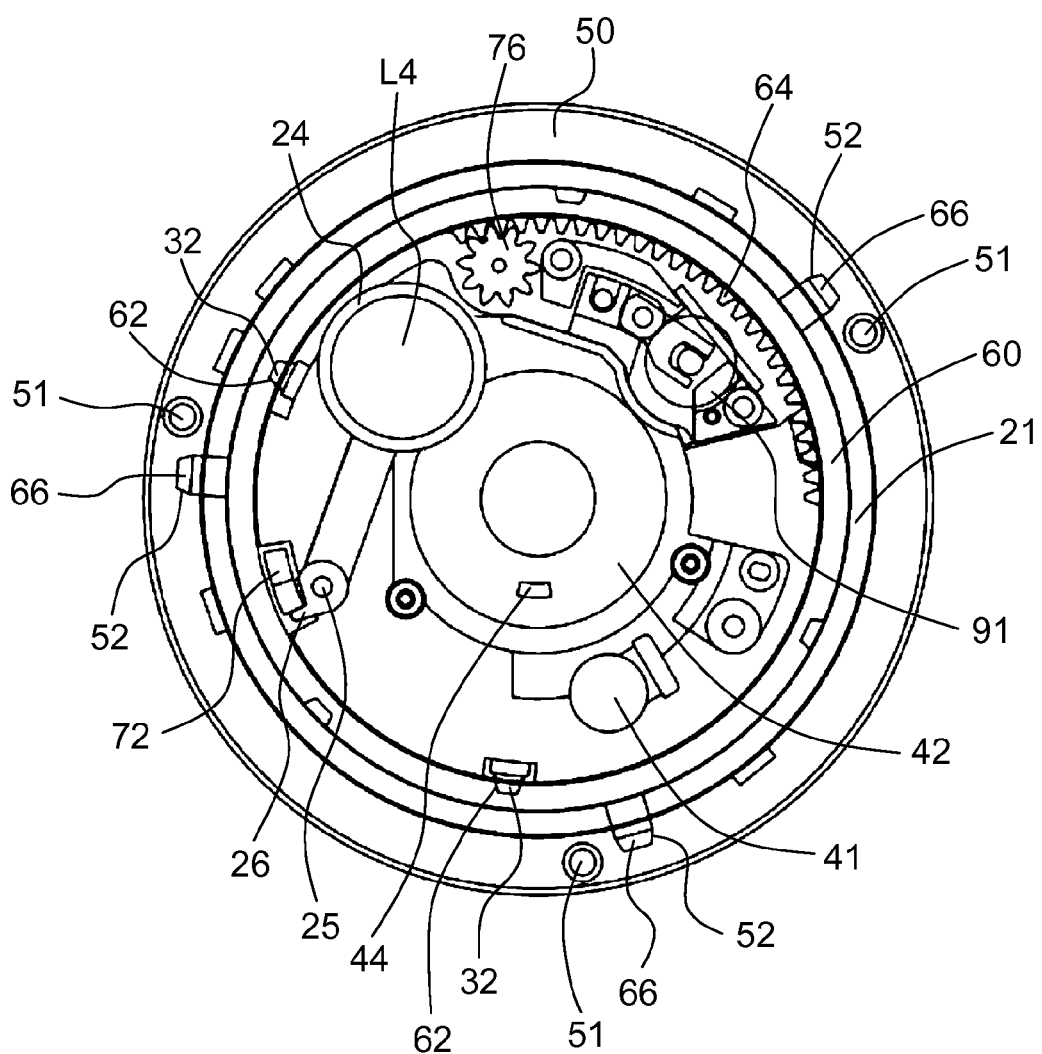
FIG. 5 is a schematic view for illustrating lens barrel 2 (in a storage state) in cross section perpendicular to an optical axis.
Figure 6:
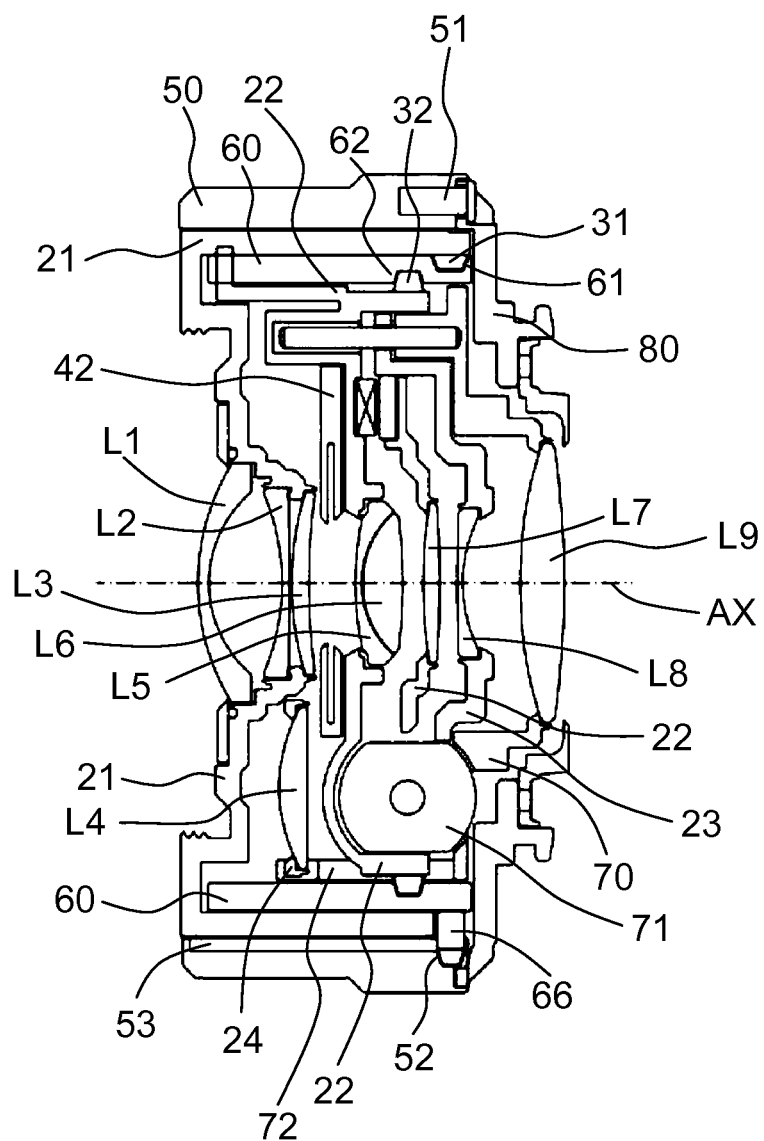
FIG. 6 is a schematic view for illustrating lens barrel 2 (in the storage state) in cross section parallel to the optical axis.

FIGS. 5 and 6 are cross-sectional views of lens barrel 2 in a storage state (collapsed state). FIG. 5 is a cross-sectional view along a plane perpendicular to optical axis AX. FIG. 6 is a cross-sectional view along a plane parallel to optical axis AX. The storage state refers to a state where imaging device 1 is not used for imaging and a length of lens barrel 2 in the optical axis AX direction is the smallest.

As shown in FIG. 5, lens barrel 2 includes first lens frame 21 disposed on an inner peripheral side of outer frame 50, cam frame 60 disposed on an inner peripheral side of first lens frame 21, and retracting lens frame 24, aperture motor 41, aperture unit 42, and focus motor 91 disposed on an inner peripheral side of cam frame 60. Cam frame 60 is one example of a rotary frame. In the storage state, retracting lens frame 24 is disposed on the inner peripheral side of cam frame 60 and at a position retracted from optical axis AX.

As shown in FIG. 6, lens barrel 2 includes first lens frame 21 which holds lenses L1, L2, L3, retracting lens frame 24 which holds lens L4, second lens frame 22 which holds lenses L5, L6, L7, third lens frame 23 which holds lens L8, and fixed frame 70 which holds lens L9. Lens L4 is one example of a retracting lens.

Outer frame 50 is a member having a substantially cylindrical shape. Outer frame 50 is fixed to lens mount 80 using screws 82 at connecting portion 51. Connecting portion 51 is inserted into outer frame 50 by a predetermined length. Specifically, screws 82 having a predetermined length are threadedly inserted into female threads formed on outer frame 50. Fixed frame 70 is fixed to lens mount 80.

As shown in FIG. 6, third cam grooves 52 and rectilinear groove 53 are formed on the inner peripheral surface of outer frame 50. Outer frame 50 holds cam frame 60 such that cam frame 60 can advance and retract in the optical axis AX direction and is rotatable about optical axis AX.

As shown in FIG. 6, cam frame 60 includes third cam followers 66 and first cam groove 61 on an outer peripheral surface thereof. As shown in FIG. 5, cam frame 60 includes second cam grooves 62 and gear portion 64 on the inner peripheral surface thereof.

Third cam follower 66 is engaged with third cam groove 52 of outer frame 50 which is disposed on the outer peripheral side of cam frame 60. With such a configuration, when cam frame 60 is rotated relative to outer frame 50, third cam follower 66 moves along third cam groove 52. As a result, cam frame 60 advances or retracts in the optical axis AX direction relative to outer frame 50.

As shown in FIG. 6, first cam groove 61 is engaged with first cam follower 31 of first lens frame 21 which is disposed on the outer peripheral side of cam frame 60. With such a configuration, when cam frame 60 is rotated relative to first lens frame 21, first cam follower 31 moves along first cam groove 61. As a result, first lens frame 21 advances or retracts in the optical axis AX direction relative to cam frame 60. The principle of rotation of cam frame 60 will be described later.

Second cam groove 62 is engaged with second cam follower 32 of second lens frame 22 which is disposed on the inner peripheral side of cam frame 60. With such a configuration, when cam frame 60 is rotated relative to second lens frame 22, second cam follower 32 moves along second cam groove 62. As a result, second lens frame 22 advances or retracts in the optical axis AX direction relative to cam frame 60.

Gear portion 64 shown in FIG. 5 is meshed with transmission mechanism 76 of zooming motor 71 which is disposed on the inner peripheral side of cam frame 60. Zooming motor 71 shown in FIG. 6 is fixed to fixed frame 70. Rotational power of zooming motor 71 is transmitted to gear portion 64 by way of transmission mechanism 76 so that cam frame 60 is rotated.

Figure 7:
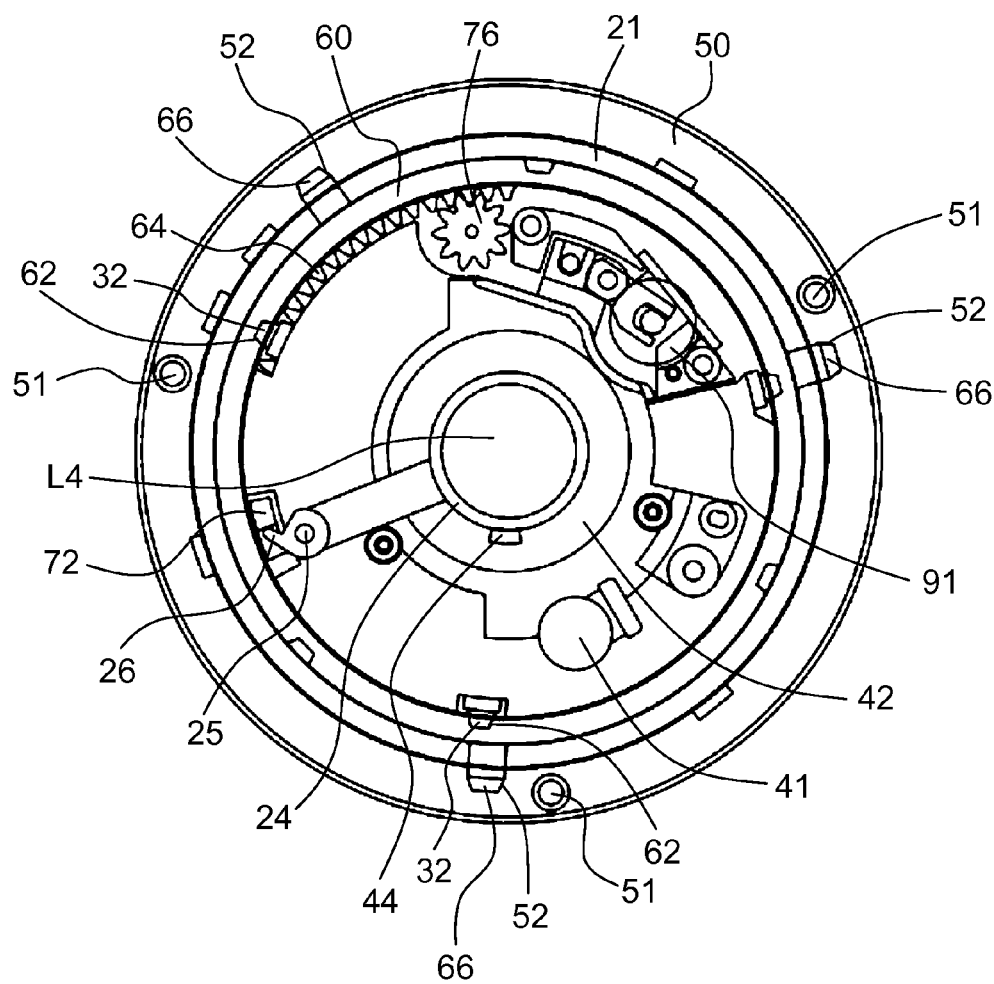
FIG. 7 is a schematic view for illustrating lens barrel 2 (in an in-use state) in cross section perpendicular to the optical axis.

In the storage state, as shown in FIG. 5, retracting lens frame 24 is positioned on the inner peripheral side of cam frame 60. That is, lens L4 retracts to the inner peripheral side of cam frame 60 from optical axis AX. Further, in the storage state, as shown in FIG. 6, zooming motor 71 is disposed on an imaging surface side of retracting lens frame 24 in the optical axis AX direction. That is, lens L4 and zooming motor 71 are arranged in row in this order from the subject side in the optical axis AX direction. Accordingly, zooming motor 71 is disposed transversely such that a length in the optical axis AX direction is smaller than a length in the direction perpendicular to the optical axis AX direction and the radial direction. However, aperture motor 41 and focus motor 91 shown in FIGS. 5 and 7 are disposed such that the respective lengths of these motors 41, 91 become relatively large in the optical axis AX direction. Accordingly, as shown in FIG. 5, retracting lens frame 24 retracts toward a side where neither aperture motor 41 nor focus motor 91 are positioned so as to avoid the interference of retracting lens frame 24 with aperture motor 41 and focus motor 91.

Further, in the storage state, as shown in FIG. 6, retracting lens frame 24 and first lens frame 21 are arranged parallel to each other in the radial direction. Accordingly, lens L4 held by retracting lens frame 24 and lens L3 held by first lens frame 21 are also arranged parallel to each other in the radial direction.

Figure 8:
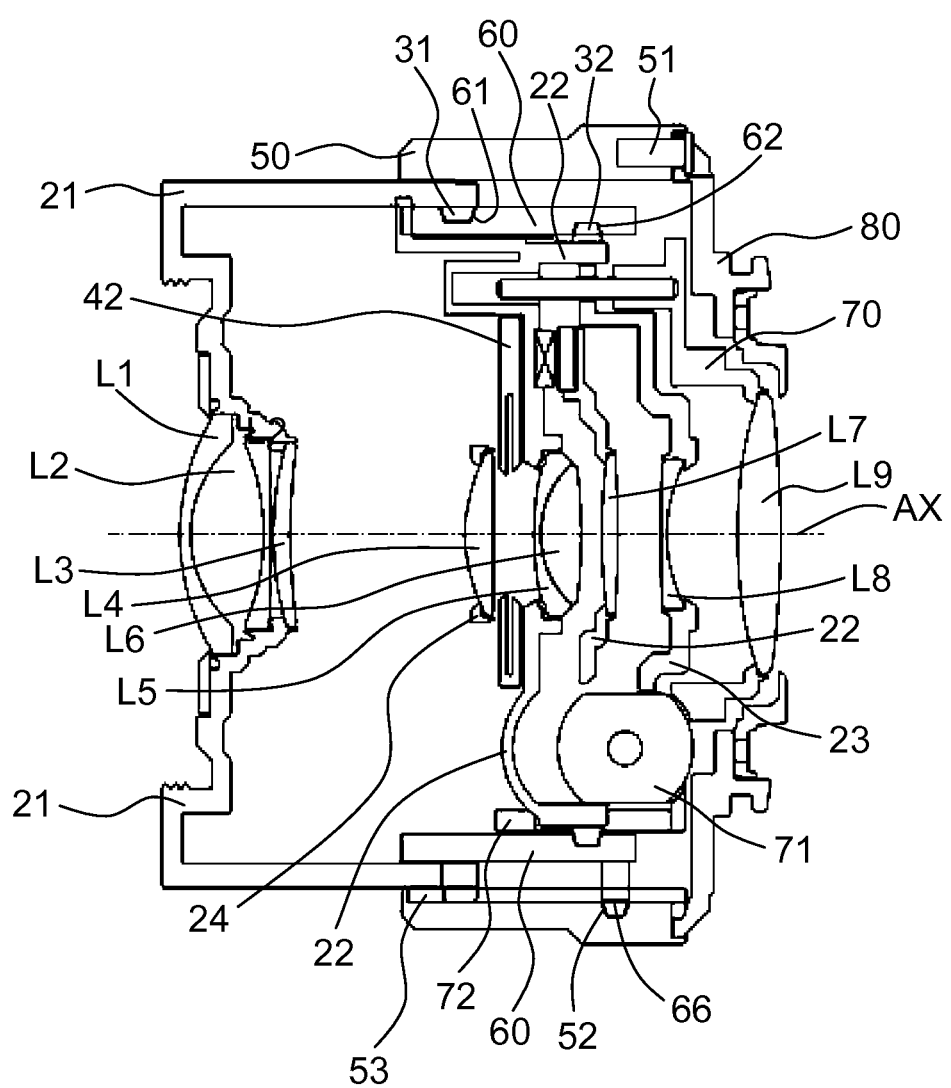
FIG. 8 is a schematic view for illustrating lens barrel 2 (in the in-use state) in cross section parallel to the optical axis.

FIGS. 7 and 8 are cross-sectional views of lens barrel 2 when lens barrel 2 is in an in-use state (wide angle end state) in the optical axis AX direction. FIG. 7 is a cross-sectional view of lens barrel 2 along a plane perpendicular to optical axis AX. FIG. 8 is a cross-sectional view along a plane parallel to optical axis AX. The in-use state refers to a state where imaging device 1 is used for imaging. A length of lens barrel 2 in the optical axis AX direction in the in-use state becomes larger than that in the storage state. FIGS. 7 and 8 show the configuration of lens barrel 2 when lens barrel 2 is in the wide angle end state as one example of the lens barrel in the in-use state.

As shown in FIGS. 7 and 8, in the in-use use state, lens L4 held by retracting lens frame 24 is positioned on the optical axis. Further, the position of retracting lens frame 24 and the position of lens L4 in the in-use state shown in FIG. 8 overlap with the position of first lens frame 21 and the position of lens L3 in the storage state shown in FIG. 6, respectively.

Next, a retracting operation of retracting lens frame 24 in lens barrel 2 will be described. Second lens frame 22 holds retracting lens frame 24 to which lens L4 is fixed. Accordingly, retracting lens frame 24 moves in the optical axis AX direction integrally with second lens frame 22.

Retracting lens frame 24 is held by second lens frame 22 in a rotatable manner about rotary portion 25 relative to second lens frame 22. A force which moves retracting lens frame 24 in the optical axis AX direction from an inner peripheral side of second lens frame 22 always acts on retracting lens frame 24 shown in FIG. 5 by a coil spring (not shown). As shown in FIGS. 7 and 8, retracting lens frame 24 is disposed on optical axis AX of lenses in the in-use state. Here, the rotation of retracting lens frame 24 about rotary portion 25 is restricted by stopper 44 mounted on second lens frame 22. That is, in a state where the rotation of retracting lens frame 24 is restricted by stopper 44, the center of lens L4 is substantially aligned with optical axis AX.

On the other hand, as shown in FIGS. 5 and 6, retracting lens frame 24 is configured to retract from the optical axis of the lenses in the storage state. When lens barrel 2 is shifted from the in-use state to the storage state, stopper 44 releases the restriction imposed on the movement of retracting lens frame 24. The retracting mechanism of lens L4 is realized by hook 26 of retracting lens frame 24 and rib 72 of fixed frame 70.

Specifically, with respect to rib 72 formed on fixed frame 70, a surface of rib 72 which comes into contact with hook 26 of retracting lens frame 24 is formed of an inclined surface which faces the subject side. Retracting lens frame 24 is held by second lens frame 22 and hence, when second lens frame 22 moves to the imaging surface side, hook 26 of retracting lens frame 24 comes into contact with the inclined surface of rib 72 and receives a force so that retracting lens frame 24 is rotated about rotary portion 25. As a result, as shown in FIGS. 5 and 6, in the storage state, lens L4 moves to a retracted position.

In this exemplary embodiment, when lens barrel 2 is shifted from the in-use state to the storage state, retracting lens frame 24 retracts while rotating in the counterclockwise direction about rotary portion 25 as viewed from the subject side. In this case, in the in-use state (wide angle end state), as shown in FIG. 7, transmission mechanism 76 is meshed with an end portion of gear portion 64 on a clockwise side. On the other hand, in the storage state, as shown in FIG. 5, transmission mechanism 76 is meshed with an end portion of gear portion 64 on a counterclockwise side.

With such a configuration, when lens barrel 2 is shifted from the in-use state to the storage state, retracting lens frame 24 rotates about rotary portion 25 in the counterclockwise direction, and moves toward the inner peripheral side of cam frame 60 from the optical axis AX side.

Here, cam frame 60 rotates about optical axis AX in the clockwise direction, and gear portion 64 disposed on the inner peripheral side of cam frame 60 also rotates in the clockwise direction. Then, retracting lens frame 24 retracts to a position in the vicinity of a position where the counterclockwise-side end portion of gear portion 64 is located in the in-use state. That is, in a collapsed state of lens barrel 2, retracting lens frame 24 is located at a position where gear portion 64 is in the in-use state. With such a configuration, the interference between retracting lens frame 24 (lens L4) and gear portion 64 in the storage state can be avoided. In this manner, by using a space which gear portion 64 uses for the rotation and a space which lens L4 uses for the retraction partially in common, the miniaturization of the lens barrel can be realized.

When lens barrel 2 of this exemplary embodiment is in the storage state, retracting lens frame 24 is held at a position where retracting lens frame 24 is retracted from optical axis AX. When lens barrel 2 is in the in-use state (photographable state), retracting lens frame 24 moves to optical axis AX and is held on optical axis AX. Cam frame 60 is rotated so that a gear portion 64 moves to a place where retracting lens frame 24 is held in the storage state.

In lens barrel 2 of this exemplary embodiment, by retracting, in a retracted state, lens L4 which is on optical axis AX in the in-use state, the miniaturization of lens barrel 2 in the optical axis direction can be realized. Further, in lens barrel 2 in the in-use state, gear portion 64 moves to a place where retracting lens frame 24 is retracted in the storage state and hence, it is possible to effectively use spaces thus realizing the miniaturization of lens barrel 2 in the radial direction.

With such a configuration, the end portion of cam frame 60 on a lens mount 80 side and connection portions 51 will not interfere with each other. Accordingly, in a state where cam frame 60 is stored in outer frame 50, it is possible to realize lens barrel 2 in a more compact manner.

The exemplary embodiment has been described above as an example of the technique according to this disclosure. For this purpose, the accompanying drawings and the detailed description are provided.

Accordingly, the constitutional elements described in the accompanying drawings and the detailed description may include not only the constitutional elements necessary for overcoming the problems but also constitutional elements which are unnecessary for overcoming the problems in order to exemplify the aforementioned techniques. Therefore, such unnecessary constitutional elements should not be immediately determined to be necessary, for the reason that these elements are described in the accompanying drawings and the detailed description.

Further, the aforementioned exemplary embodiment is merely for exemplifying the techniques according to this disclosure and, therefore, various changes, replacements, additions, omissions and the like can be made thereto within the scope of the claims and scopes equivalent thereto.

The lens barrel which has been described above is applicable to a digital still camera, an interchangeable lens, and the like.

What is claimed is:

1. A lens barrel comprising:
   a rotary frame having a gear on an inner peripheral surface, the rotary frame being rotatable about an optical axis in a first rotational direction and a second rotational direction opposite the first rotational direction, wherein the rotary frame is rotatable in the first rotational direction from a retracted state to an in-use state and the rotary frame is rotatable in the second rotational direction from the in-use state to the retracted state, the gear having an end portion that extends in the first rotational direction when in the in-use state; and
   a retracting lens frame which holds a retracting lens that is positioned on the optical axis during the in-use state and configured to retract from the optical axis along with rotation of the rotary frame in the second rotational direction towards the retracted state,
   wherein during the retracted state, the retracting lens frame retracts to a position where the end portion of the gear of the rotary frame is located at the position during the in-use state.

2. The lens barrel according to claim 1, wherein
   the rotary frame includes a first cam groove on an outer peripheral surface, and a second cam groove on the inner peripheral surface,
   the lens barrel further comprising:
   a first lens frame having a first cam follower which is mounted on the first cam groove; and
   a second lens frame having a second cam follower which is mounted on the second cam groove,
   wherein the retracting lens frame is held by the second lens frame.

3. The lens barrel according to claim 1, further comprising a zooming motor for rotating the rotary frame,
   wherein a position where the retracting lens retracts is a position where the retracting frame and the zooming motor are arranged parallel to each other in an optical axis direction.

* * * * *